United States Patent
Ermidis

[15] 3,697,620
[45] Oct. 10, 1972

[54] VULCANIZABLE ELASTOMER COMPOSITION CONTAINING TRIARYLPHOSPHINE AND TRIALLYLCYANURATE

[72] Inventor: Nicholas Peter Ermidis, West New York, N.J.

[73] Assignee: American Cyanamid Company, Stamford, Conn.

[22] Filed: April 22, 1970

[21] Appl. No.: 31,011

[52] U.S. Cl............260/836, 260/77.5 NC, 260/879, 260/884, 260/901
[51] Int. Cl.............................C08f 15/18, C08f 15/26
[58] Field of Search................260/884, 77.5 NC, 836

[56] References Cited

UNITED STATES PATENTS 3,351,604   11/1967   Safford et al.............260/31.8
3,141,850   7/1964   Lybeck.....................252/63.5

OTHER PUBLICATIONS

Kidwell, R. L.; " Dehalogenation with Triphenylphosphine" ; Dissertation Abstracts, B27(7), p. 2296– B (1967).

*Primary Examiner*—Samuel H. Blech
*Assistant Examiner*—J. Seibert
*Attorney*—John M. Miele

[57] ABSTRACT

A vulcanizable composition having improved processing safety, as well as an improved resistance to heat aging, is provided which comprises an acrylic elastomer having active halogen or epoxy groups and a triarylphosphine and triallylcyanurate.

9 Claims, No Drawings

VULCANIZABLE ELASTOMER COMPOSITION CONTAINING TRIARYLPHOSPHINE AND TRIALLYLCYANURATE

Generally stated, the subject matter of the present invention relates to synthetic elastomers containing active halogen or epoxy groups and more particularly to an improved vulcanizable composition containing an acrylic elastomer.

BACKGROUND OF THE INVENTION

Various cure systems have been proposed for acrylic elastomers. Some of the more successful ones use ammonium salts such as ammonium benzoate or ammonium adipate or a combination of sodium oleate and sulfur. While such systems can be used to advantage in compositions to be compression molded, they do not always provide adequate processing safety, nor do they provide completely adequate resistance to heat aging.

It is an object of this invention to provide a vulcanizable composition containing a synthetic elastomer having active halogen or epoxy groups which has improved resistance to heat aging.

Another object of the invention is to provide a vulcanizable composition containing an acrylic elastomer having active halogen or epoxy groups which provides improved processing safety.

A still further object of the invention is to provide a vulcanizable composition containing an acrylic elastomer having active halogen or epoxy groups which produces a vulcanized product having good compression set.

Another object of the invention is to provide a process for producing a vulcanized acrylic elastomer having improved physical properties.

THE INVENTION

The foregoing objects and others are accomplished in accordance with this invention by providing a vulcanizable composition containing an acrylic elastomer having halogen or epoxy groups and a combination of a triarylphosphine and triallylcyanurate in an amount sufficient to vulcanize the composition. It has been found that although neither a triarylphosphine nor triallylcyanurate alone is effective for vulcanizing an acrylic elastomer having active halogen or epoxy groups, a combination of the two provides a composition which can be vulcanized and has improved resistance to heat aging and improved processing safety. The vulcanizate resulting from curing the composition containing an acrylic elastomer provided by this invention also has good compression set characteristics.

The invention can be practiced in preparing vulcanizable compositions containing any synthetic elastomer having active halogen or epoxy vulcanization sites such as homopolymers of chloroprene, copolymers of chloroprene with polymerizable vinyl or diene compounds, chlorinated butyl rubber and the like. However, acrylic elastomers having active halogen or epoxy groups including those disclosed in U.S. Pat. Nos. 3,201,373 and 3,312,677 are preferred. More specifically, the invention contemplates acrylic elastomers prepared by polymerizing alkyl acrylates and alkoxy alkyl acrylates, for example, 95 per cent ethyl acrylate, with 5 per cent of an epoxy-containing comonomer such as glycidyl methacrylate or glycidyl acrylate and various chlorine or bromine containing copolymers such as, for example, a 95 per cent ethyl acrylate and 5 per cent vinyl chloroacetate copolymer.

Any suitable triarylphosphine may be used such as, for example, triphenylphosphine, tris(2-methylphenyl) phosphine, tris(3-methylphenyl) phosphine, tris(2,4-dimethylphenyl) phosphine, tris (2,5-dimethylphenyl) phosphine, tris (1-naphthyl) phosphine, tris(2-naphthyl) phosphine, tris (2-methoxyphenyl) phosphine, tris (3-methoxyphenyl) phosphine, tris (4-methoxyphenyl) phosphine, tris (4-phenoxyphenyl) phosphine and the like. Triphenylphosphine is preferred. From about 1 part to about 5 parts, by weight, preferably from about 1.5 to 3 parts of triarylphosphine with from about 2 parts to about 5 parts, by weight, preferably from about 3 to 4 parts triallylcyanurate per 100 parts acrylic elastomer may be used. The vulcanizable composition may contain mixtures of an acrylic elastomer with other synthetic elastomers and may contain conventional compounding ingredients such as carbon black, antioxidants, stearic acid, fillers or the like.

The vulcanizable composition provided by this invention may be prepared by conventional compounding techniques. The various ingredients of a composition except for the triarylphosphine and triallylcyanurate may be first mixed on a two-roll mill or in a Banbury mixer. The triarylphosphine and triallylcyanurate may then be mixed either separately or simultaneously with the composition by milling on a two-roll mill until a substantially uniform composition is obtained.

The following examples are provided for illustrative purposes and may include particular features of the invention. However, the examples should not be construed as limiting the invention, many variations of which are possible without departing from the spirit or scope thereof.

EXAMPLES I THROUGH IV

About 100 parts by weight of an acrylic elastomer prepared from about 95 per cent ethyl acrylate and about 5 per cent vinyl chloroacetate, about 1 part stearic acid and about 60 parts carbon black are mixed in a Banbury mixer until a substantially uniform mixture is obtained. Triphenylphosphine and triallylcyanurate are milled with the resulting mixture on a two-roll rubber mill in the amounts shown for each example in Table 1 until a substantially uniform mixture is obtained. Each mixture is then cured for about 10 minutes at about 380° F. The physical properties of the cured products are recorded in Table 1.

TABLE 1

| Example | I | II | III | IV |
| --- | --- | --- | --- | --- |
| Parts Triphenylphosphine | 1 | 1 | 1.5 | 1.5 |
| Parts Triallylcyanurate | 4 | 3 | 3 | 4 |
| Tensile Strength, psi | 1585 | 1570 | 1635 | 1710 |
| Elongation, % | 230 | 245 | 200 | 180 |
| Modulus at 100%, psi | 800 | 735 | 980 | 1200 |
| Hardness Shore A | 69 | 66 | 70 | 71 |
| Compression set, %* (after 70 hours at 150° C.) | 27.9 | 31 | 31.3 | 23.4 |

*Determined on samples which had been post cured for 16 hours at 150° C.

EXAMPLES V AND VI

About 100 parts by weight of an acrylic elastomer prepared from about 95 per cent ethyl acrylate and about 5 per cent vinyl chloroacetate, about 1 part stearic acid and about 60 parts carbon black are mixed in a Banbury mixer until a substantially uniform mixture is obtained. Triphenylphosphine and triallylcyanurate are milled with the resulting mixture on a two-roll rubber mill in the amounts shown for each example in Table 2 until a substantially uniform mixture is obtained. Each mixture is then cured for about 10 minutes at about 380° F. The physical properties of the cured products are recorded in Table 2.

TABLE 2

| Example | V | VI |
|---|---|---|
| Parts Triphenylphosphine | 3 | 2 |
| Parts Triallylcyanurate | 3 | 3 |
| Tensile Strength, psi | 1685 | 1785 |
| Elongation, % | 200 | 190 |
| Modulus at 100%, psi | 1080 | 1200 |
| Hardness Shore A | 70 | 71 |
| Mooney Scorch at 330° F. | | |
| $t_5$, minutes | 6.3 | 8 |
| $t_{30}$, minutes | 3 | 5 |
| Mooney Scorch at 380° F. | | |
| $t_5$, minutes | 1.8 | 2.5 |
| $t_{30}$, minutes | 0.8 | 1 |
| Compression set, %* | | |
| (after 70 hours at 150°C.) | 22.2 | 19.2 |

*Determined on samples which had been post cured for 16 hours at 150°C.

When the process of the foregoing examples is repeated except about 1.5 parts triphenylphosphine or about 4 parts triallylcyanurate alone is used instead of one of the mixtures thereof, there is no reaction in the Mooney Scorch test at 330° F., which indicates that neither component of the novel mixture provided herein has any effect on the vulcanization of an acrylic elastomer containing active halogen.

The improved scorch protection provided by this invention is illustrated by repeating the process of Examples I through IV with the exception that about 2 parts phenyl-beta-naphthylamine, about 3.5 parts sodium oleate and about 0.3 part sulfur are substituted in Sample A for the mixtures of triphenylphosphine and triallylcyanurate and about 2 parts phenyl-beta-naphthylamine and about 4 parts ammonium benzoate are substituted in Sample B for the triphenylphosphine and triallylcyanurate combination. The following test results are obtained.

| | Sample A | Sample B |
|---|---|---|
| Mooney Scorch at 330°F. | | |
| $t_5$, minutes | 1.6 | 1.5 |
| $t_{30}$, minutes | 0.6 | 0.8 |

Comparison of the $t_5$ values of Samples A and B with the $t_5$ values in Table 2 indicates that at 330° F., where compositions A and B are curing rapidly, the compositions containing mixtures of triphenylphosphine and triallylcyanurate still have adequate processing safety.

EXAMPLE VII

Compositions A and B are prepared by repeating Example 1 except that about 2 parts triphenylphosphine and about 4 parts triallylcyanurate are used in preparing composition A and about 1 part triphenylphosphine and about 4 parts triallylcyanurate are used in preparing composition B. Additionally, about 2 parts phenyl-beta-naphthylamine are mixed into each composition. These compositions are cured for about 10 minutes at 380° F., and post cured 16 hours at 300° F. Stress Relaxation studies are used to measure the thermal stability of the polymers. The samples are tested on a six-channel, autographic stress-relaxometer. This instrument consists of load sensing elements, a means for extending and maintaining the specimens at a constant elongation, and a circulating air oven. The oven temperature is maintained at 176° C. ± 0.1° C. and the samples are extended to 5 ± 0.05 percent. The decrease in modulus with time, which is due to thermal degradation, is recorded automatically. Data relating to the relative thermal stability are obtained from plots of $f(t)/f(0)$ versus log time, or log $f(t)/f(0)$ versus time, where $f(t)$ and $f(0)$ are forces at time $t$ and $t=0$, respectively, required to maintain the sample at a given extension. The data are reported as $T_{50}$ and represent the time in minutes at 176° C. required for the sample to degrade to 50 per cent of the initial stresses. This is a measure of the amount of degradation experienced by the specimen.

Thermal Stability at 176°C.

| $T_{50}$ | Composition A | Composition B |
|---|---|---|
| | 18,000 | >20,000 |

Comparable studies using previously known cure systems, as described hereinabove, show $T_{50}$ values of the order of 8,000 – 10,000 minutes. Thus, the above data indicate the extent of improvement in thermal stability of the cure system of the present invention.

Although the invention has been described in detail for the purpose of illustration, it is to be understood that such detail is solely for that purpose and that variations can be made by those skilled in the art without departing from the spirit and scope of the invention except as it may be limited by the claims.

What is claimed:

1. A vulcanizable mixture comprising an acrylic elastomer having active halogen atoms or epoxy groups, from about 1 to about 5 parts of triarylphosphine and from about 2 to about 5 parts of triallylcyanurate per 100 parts by weight of said elastomer.

2. The composition of claim 1 wherein the triarylphosphine is triphenylphosphine.

3. The composition of claim 1 wherein said elastomer is an acrylic ester elastomer containing active halogen atoms.

4. The composition of claim 1 wherein said elastomer is an acrylic ester elastomer containing epoxy groups.

5. A vulcanizable mixture comprising a copolymer of ethyl acrylate and vinyl chloroacetate, from about 1 to about 5 parts of triphenylphosphine and from about 2 to about 5 parts of triallylcyanurate per 100 parts of said copolymer.

6. The method of vulcanizing an acrylic elastomer which comprises heating the mixture of claim 1 at a temperature above about 330° F. until a vulcanized elastomer is obtained.

7. The vulcanized product of the process of claim 6.

8. The method of claim 6 wherein said triarylphosphine is triphenylphosphine.

9. A method of vulcanizing an acrylic elastomer which comprises heating the mixture of claim 2 at a temperature above about 330° F. until a vulcanized elastomer is obtained.

* * * * *